A. A. BOWSER.
MOTOR FOR LIQUID METERS.
APPLICATION FILED FEB. 25, 1918.

1,294,760.

Patented Feb. 18, 1919.
2 SHEETS—SHEET 1.

Witness:

Inventor,
Allen A. Bowser
By Brown & Risser
Attys.

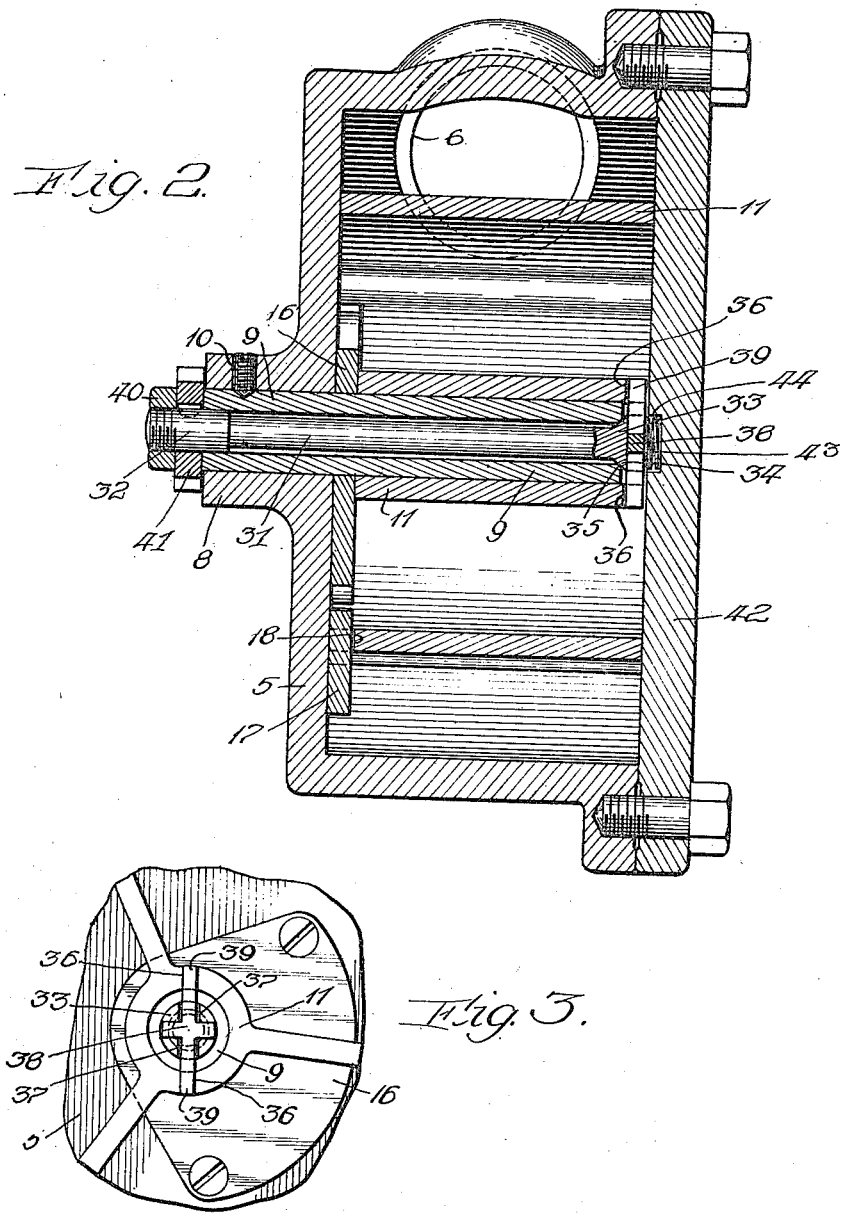

UNITED STATES PATENT OFFICE.

ALLEN A. BOWSER, OF FORT WAYNE, INDIANA, ASSIGNOR TO S. F. BOWSER & COMPANY, OF FORT WAYNE, INDIANA, A CORPORATION OF INDIANA.

MOTOR FOR LIQUID-METERS.

1,294,760.      Specification of Letters Patent.      Patented Feb. 18, 1919.

Application filed February 25, 1918. Serial No. 218,982.

*To all whom it may concern:*

Be it known that I, ALLEN A. BOWSER, a citizen of the United States, residing at Fort Wayne, in the county of Allen and State of Indiana, have invented certain new and useful Improvements in Motors for Liquid-Meters, of which the following is a specification.

This invention relates to a rotary vaned construction for metering liquid by the flow thereof and is particularly designed and intended for use with liquids having a low head or pressure, the object being to provide a new and improved construction for measuring the amount of liquid which passes through a pipe by registering the amount of rotation of the rotatable portion of the construction through a driving spindle.

The invention consists in the novel construction, combination and arrangement of the parts.

Other objects will appear hereinafter.

In the accompanying drawings,

Fig. 2 is another sectional view showing the construction of the meter.

Fig. 3 is a detail view showing the driving connection between the rotor and spindle.

Figure 1:
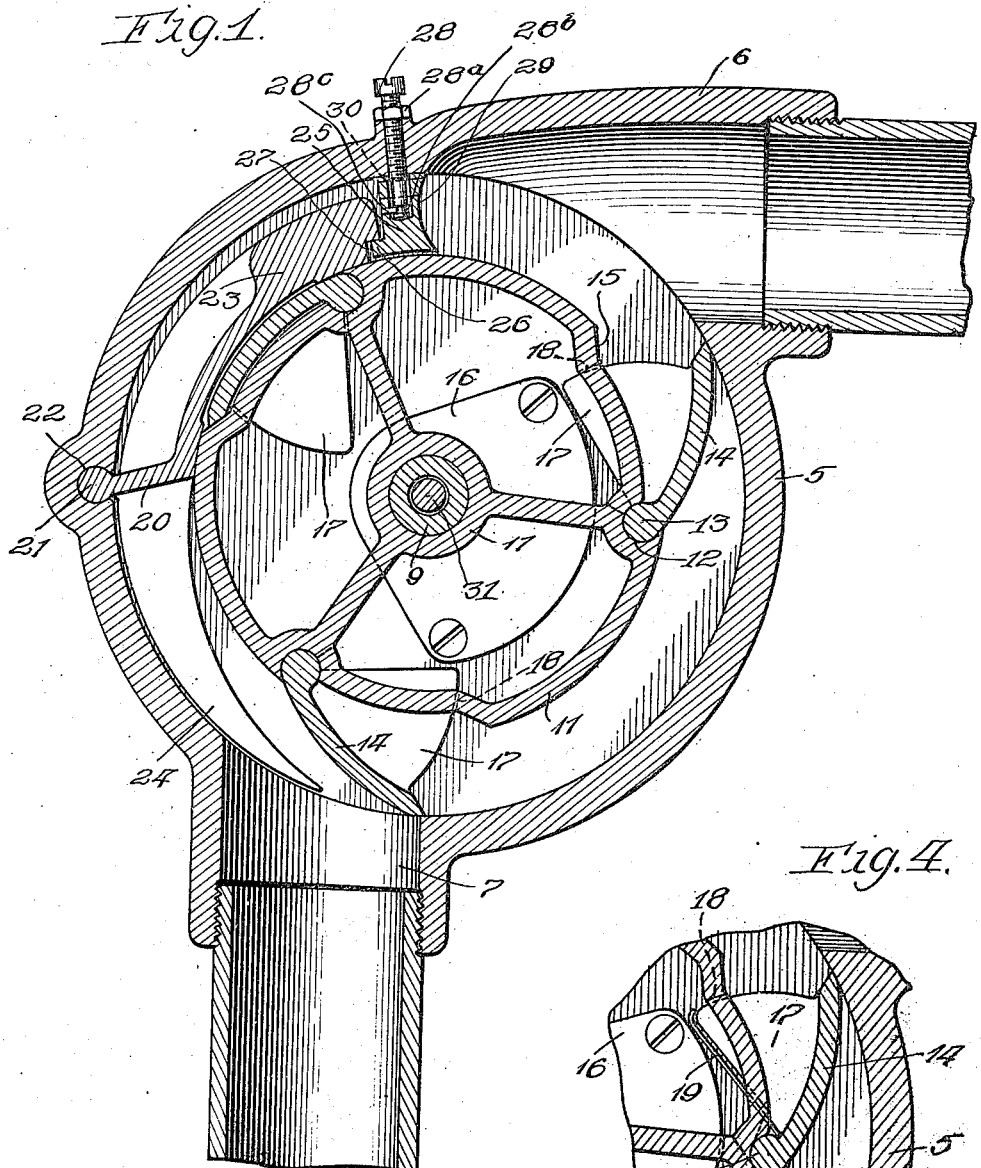
Figure 1 is a sectional elevation of a meter constructed in accordance with the principles of the invention.

In order that a meter of this kind will register accurately the amount of liquid which passes through it, it is necessary not only that the vanes be projected at the proper time, but also that a proper liquid seal is provided for preventing the passage of liquid around that portion of the path in which the vanes are closed. The present construction provides means for positively projecting the vanes into the path of the liquid as it comes from the inlet and other means for gradually closing the vanes against the rotor after they have passed the outlet. It is also desirable in a meter of this kind to construct the parts so that they can be easily cast or machined to the proper shape and size, thereby materially reducing the cost of construction.

The casing 5 of the present construction is preferably circular in form with a peripheral inlet 6 and an outlet 7. At one side of the casing is a hub 8 in which a bearing shell 9 is secured by means of a fastening screw 10. Mounted on the shell 9 is a rotor 11 which has transverse circular grooves 12 at spaced distances in its periphery for seating circular ends 13 of vanes 14 for hinged movement with respect to the rotor, the surface of which is formed with a recess or seat 15 so that when each vane 14 is pressed against the rotor, the outer surface will be substantially in line with the remaining outer surface of the rotor.

Figure 4:
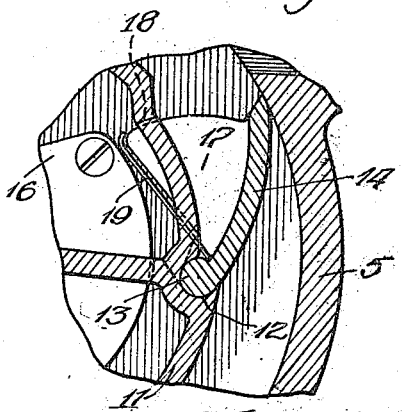
Fig. 4 is a sectional detail showing a spring for operating one of the vanes.

Secured to the casing, adjacent the hub 8, is a cam 16 which is adapted to engage the extensions or tail pieces 17 on each of the vanes 14 which extend at one end only through slots 18 in the rotor. Of course this cam may be provided for either or both ends of the vanes, and the vanes would then have corresponding tail pieces 17. If desired a spring finger 19, as shown by Fig. 4, may be inserted in each one of the vanes 14 so that it extends between the tail piece 17 and the cam 16 to press the vane outwardly at the proper time so that it will bear yieldingly against the casing, thereby taking up any wear or inaccuracy of the parts and preventing leakage past the vanes.

As the rotor is circular in form and mounted at the center of the casing, an annular space is formed between it and the casing which ordinarily would form a double path from the inlet to the outlet, but disposed in the casing in this annular space and between the outlet and the inlet is a movable member 20 which has a rounded portion 21 for pivoting it in a circular groove 22 of the casing with a weighted upper end 23 and an extending lower tongue or extremity 24 which is adapted to engage the vanes 14 for moving them inwardly against the rotor after they have passed the outlet 7. The casing is normally disposed in an upright position, as shown in Fig. 1, and the weighted end 23 of this member 20 causes it to bear lightly against the rotor 11 and as the member extends entirely across the casing, substantially filling it, it forms a fluid seal for preventing the liquid from passing from the inlet to the outlet through this portion of the annular space.

In order to vary and limit the distance between the weighted end 23 of this member 20 and the rotor, a fixed or adjustable partition 25 is disposed adjacent the weighted end 23 which has a projection 26 for engaging a shoulder 27 of the member 20. A screw 28 is threaded through the casing from the outside thereof with a locknut 28$^a$ on the outside, and is loosely rotatable in the partition 25 with a groove 28$^b$ near the end of the screw and a set-screw 28$^c$ threaded into the partition and engaging the groove, so that the position of the partition can be varied by moving the screw inwardly or outwardly, thus varying the relation of the weighted end 23 of the member 20 to the rotor. The opposite side of the partition is formed with a concave portion 29 which constitutes a continuation of the inlet 6 and tends to direct the incoming liquid downwardly toward the outlet. A perforation 30 is also provided in the partition for admitting fluid under pressure to the back side of the member 20 so that it will be held lightly against the projection 26 even though the casing is not in an upright position, as shown in Fig. 1, and also to equalize the pressure in the casing. It will be observed that the member 20 may have a slight rocking movement upon its pivoted portion 21 which will permit particles of dirt to pass between it and the rotor without injuring either of them, the partition 25 being also spaced slightly from the rotor to allow foreign particles to pass so that upon the next rotation these particles may be swept through the outlet by the liquid.

Disposed within the bearing shell 9 is a rotary spindle 31 which has a portion 32 fitting the shell closely and threaded at the outer end. The other end is formed with an enlarged head 33 which has a beveled portion 34 adapted to bear against the inner end of the shell 9 which may also have a correspondingly beveled portion 35 thereby constituting in effect a valve and its seat. The adjacent end of the rotor bearing extends beyond the inner end of the bearing shell 9 and is formed with diametrically opposite slots 36; the head 33 is formed with a cross-slot 37, one portion of which may be moved in substantial alinement with the slots 36 of the rotor. A connecting cross piece 38 is then disposed in the cross-slot of the head and it has opposite extremities 39 which engage in the slots 36 of the rotor for slidable movement in one direction and the cross piece is loosely mounted in the head 33 so that it may be slidably moved in the transverse direction, thus constituting a limited universal connection which will automatically take up any wear or inaccuracy between the parts and will thus constitute an efficient driving connection between the rotor 11 and the spindle 31. The spindle will be held upon the valve seat 35 by the pressure of the liquid in the casing, and by a spring 43 seated in a recess 44 in a cover 42 applied to the casing. A driving gear 41 may be rigidly secured to the spindle for driving the registering mechanism to which the meter is ordinarily connected. As clearly shown in Fig. 2 the driving connection is within the plane of the casing and when the cover 42 is placed upon the casing, it will make a substantially fluid-tight connection with the parts therein so that there will be no appreciable leakage between the inlet and outlet.

I claim:

1. In a rotary meter, a rotor with pivoted vanes, a casing in which the rotor is mounted with an annular space closed by the vanes, and a movable member hinged intermediate its ends in the annular space at one side of the rotor to engage the vanes and press them against the rotor.

2. In a rotary meter, a rotor with vanes pivoted at the periphery, a casing therefor having an inlet and an outlet and an annular space between it and the rotor closed by the vanes, means for moving the vanes to close the space as they pass the inlet, and means pivoted at one side of the rotor and extending in said space in both directions from the pivot for closing the vanes against the rotor and forming a seal between the inlet and discharge.

3. In a meter, a casing with a peripheral inlet and outlet, a rotor forming an annular space, vanes carried by the rotor to close said space, and a movable member pivoted intermediate its ends and forming a seal between the inlet and outlet for the portion of the space not closed by the vanes.

4. In a rotary meter, a casing having an opposite peripheral inlet and outlet, a rotor forming an annular space in the casing, means for closing one path from inlet to outlet as the rotor is operated, and means pivoted in the casing intermediate its ends and thereby partially balanced forming a seal in the other path in said space.

5. In a rotary meter, a casing having an inlet and an outlet; a rotor forming an annular space in the casing, with hinged vanes to close the space; a member pivoted intermediate its ends in one side of the casing, disposed in said space between the outlet and inlet, and adapted to engage the vanes to press them against the rotor when they pass the outlet.

6. In a meter, a casing having a circular opening and a peripheral inlet and outlet, a rotor centered therein leaving an annular space, vanes pivoted to the rotor, means to cause the vanes to close the space from inlet to outlet, and a member pivoted intermediate its ends in the side of the casing forming a seal in the space from outlet to inlet and having a projecting tip to close the vanes against the rotor as they pass the outlet.

7. In a meter, a casing having a circular opening and a peripheral inlet and outlet, a rotor centered therein leaving an annular space, vanes pivoted to the rotor, means to cause the vanes to close the space from inlet to outlet, a member pivoted in the casing and in close relation to the rotor to form a seal, and a support to limit the relation of the member to the rotor.

8. In a meter, a casing having a circular opening and a peripheral inlet and outlet, a rotor centered therein leaving an annular space, vanes pivoted to the rotor, means to cause the vanes to close the space from inlet to outlet, a weighted member hinged in the casing and in close relation to the rotor to form a seal, and an adjustable support to engage the weighted end of the member to limit its relation to the rotor.

9. In a meter, a casing, a rotor mounted upon a horizontal axis and forming an annular space therein, a weighted member pivoted in the casing with the weighted end bearing upon the rotor to form a fluid seal and additional means to support the weighted end of the member.

10. In a meter, a casing, a rotor therein, a weighted member bearing at its heavier end upon the rotor, and an adjustable shouldered portion for limiting the engagement of the said end of the member with the rotor.

11. In a meter, a casing, a rotor therein, a weighted member bearing at its heavier end upon the rotor, a perforated partition having a shoulder to engage the said end of the member to limit its engagement with the rotor, and means including a screw for varying the position of the partition.

12. In a meter, a casing and a rotor therein forming an annular space, vanes hinged on said rotor, a member hinged intermediate its ends in the side of the casing and disposed in said space forming a seal between discharge and inlet adapted also to close the vanes against the rotor, and means including a cam at one end of the casing and a tail piece on each vane for projecting the vanes across said space.

13. In a meter, a casing and a rotor therein forming an annular space, vanes hinged on said rotor, and means including a cam at one end of the casing and a spring attached to each vane and bearing continuously on the cam to project the vanes across the space and to hold them yieldingly in such position.

14. In a rotary liquid meter, a casing, a vaned rotor mounted therein for rotation under the flow of liquid, and a movable member pivotally mounted intermediate its ends in one side of the casing and lightly engaging the rotor to form a fluid seal and movable to permit dirt to pass between it and the rotor to prevent clogging and leakage.

15. In a rotary meter, a casing, a rotor with hinged vanes rotatable therein, a bearing shell upon which the rotor is mounted, a driving spindle within the shell, and means including a valve forming a fluid tight driving connection between said rotor and spindle.

16. In a rotary meter, a casing and a bearing shell therein, a rotor mounted on the shell, a spindle having a portion at one end bearing against the end of the shell to close it, and a connection between the rotor and the spindle for rotating them together.

17. In a meter, a casing, a bearing shell extending through one side of the casing, a spindle in said shell having an inclined head covering the other end of the shell, a rotor in the casing, a driving connection between the rotor and the spindle, and means to hold the head of the spindle against the shell.

18. In a meter, a casing having a bearing shell extending through one side thereof and the other end terminating within the casing, a driving spindle having a head with a beveled surface to engage and close the inner end of the shell and having a cross-slot in the head, a member rotatable on the shell having a slotted portion extending beyond the end of the shell, and a cross piece engaging the slots of the head and of the rotatable member for driving them together.

19. In a rotary meter, a casing, a rotor mounted therein having a hollow bearing axle with slots at one end, and a driving spindle with a cross-slotted head adjacent the slots of the axle, a bearing shell secured to the casing and interposed between the axle and the spindle, and a cross piece fitting slidably in one slot of the head but loosely in the other and in this other direction extending to engage slidably in the said slots of the rotor.

20. In a meter; a rotor and vanes pivoted thereto; means for projecting the vanes, including a single cam, and a spring attached to each vane and interposed between the cam and the vane to cause a continuous yielding action; and a pivoted member having an extremity for closing the vanes against the rotor.

21. In a meter; a casing, and a rotor therein forming an annular space; vanes pivoted on said rotor, each having a projecting tail piece; a cam for projecting the vanes; and a spring attached to each vane and interposed between the vane and the cam to cause a continuous yielding pressure of the vane in projected position.

22. In a meter, a casing having a bearing shell extending through one side of the casing, a spindle in said shell having a beveled head to close the inner end of the shell, a rotor in the casing, a driving connection between the rotor and spindle, and a spring to press the beveled head of the spindle against the shell.

In testimony whereof I have signed my name to this specification on this 20th day of February, A. D. 1918.

ALLEN A. BOWSER.

Witnesses:
D. R. McConnell,
M. Lerch.